United States Patent [19]

Austin et al.

[11] Patent Number: 5,598,505
[45] Date of Patent: Jan. 28, 1997

[54] CEPSTRAL CORRECTION VECTOR QUANTIZER FOR SPEECH RECOGNITION

[75] Inventors: Stephen C. Austin, San Mateo; Adam B. Fineberg, Saratoga, both of Calif.

[73] Assignee: Apple Computer, Inc., Cupertino, Calif.

[21] Appl. No.: 316,118

[22] Filed: Sep. 30, 1994

[51] Int. Cl.$^6$ .................................................. G10L 3/02
[52] U.S. Cl. ....................... 395/2.35; 395/2.31; 395/2.39; 395/2.6
[58] Field of Search .................................. 395/2.3–2.33, 395/2.25–2.28, 2.35, 2.6–2.66, 2.39; 381/46–47, 34, 35, 43, 41

[56] References Cited

U.S. PATENT DOCUMENTS

| 5,010,574 | 4/1991 | Wang | 381/43 |
| 5,208,862 | 5/1993 | Ozawa | 381/36 |
| 5,396,625 | 3/1995 | Parkes | 381/35 |

OTHER PUBLICATIONS

K. F. Lee, Automatic Speech Recognition, The Development of the SPHINX System, Kluwer Academic Publishers, Boston, 1989.

Alejandro Acero et al., "Robust Speech Recognition by Normalization of the Acoustic Space," ICASSP 91, Speech Processing 2, pp. 893–896 (May 14–17, 1991).

Fu–Hua Liu et al., "Efficient Joint Compensation of Speech for the Effects of Additive Noise and Linear Filtering," ICASSP92, Speech Processing 1, pp. I–257 through I–260 (Mar. 23–26, 1992).

Francis T. Connolly et al., "Fast Algorithms for Complex Matrix Multiplication Using Surrogates," IEEE Trans. on Acoustics, Spch & Signal Processing, vol. 37, No. 6, pp. 938–949 (Jun. 1989).

Hynek Hermansky, "Perceptual Linear Predictive (PLP) Analysis of Speech," The Journal of the Acoustical Society of America, vol. 87, No. 4, pp. 1738–1752 (Apr. 1990).

Hynek Hermansky et al., "Recognition of Speech in Additive and Convolutional Noise Based on RASTA Spectral Processing," ICASSP–93, Spch Processing, pp. II–83–II–86 (Apr. 27–30, 1993).

H. Sakoe et al., "Dynamic Programming Algorithm Optimization for Spoken Word Recognition," IEEE Trans. on Acoustics, Spch, & Signal Processing, vol. 26, No. 1, pp. 43–49 (Feb. 1978).

Alejandro Acero et al., "Environmental Robustness in Automatic Speech Recognition," ICASSP 90, vol. 2, Speech Processing 2, pp. 849–852 (Apr. 3–6,1990).

J. D. Markel et al., Linear Prediction of Speech, Springer–Verlag, Berlin, pp. 227–233 (1976).

Yoseph Linde et al., "An Algorithm for Vector Quantizer Design," IEEE Transactions on Communications, vol. COM–28, No. 1, pp. 84–95 (Jan. 1980).

(List continued on next page.)

[57] ABSTRACT

A method for correcting cepstral vectors representative of speech generated in a test environment by use of a vector quantization (VQ) system with a codebook of vectors that was generated using speech and acoustic data from a different (training) environment. The method uses a two-step correction to produce test environment cepstral vectors with reduced non-speech acoustic content. The first correction step subtracts, from the test vector, a coarse correction vector that is computed from an average of test environment cepstral vectors. The second step involves a VQ of the coarsely corrected test vector at each node of the VQ tree. The third step is the addition of a fine correction vector to the coarsely corrected test vector that is generated by subtracting a running (moving) average of the coarsely corrected test vectors associated with the deepest VQ tree node from the VQ vector closest to the coarsely corrected test vector. The method is independent of the means used to generate the cepstral vectors and the corrected output cepstra vectors may be used in various speech processing and classifying systems. The method is adaptable to non-stationary environments.

10 Claims, 8 Drawing Sheets

OTHER PUBLICATIONS

L. R. Rabiner et al., "Note on the Properties of a Vector Quantizer for LPC Coefficients," The Bell System Technical Journal, vol. 62, No. 8, Part 1, pp. 2603–2616 (Oct. 1983).

L. R. Bahl et al., "Large Vocabulary Natural Language Continuous Speech Recognition,"ICASSP.89, vol. 1, Speech Processing 1, pp. 465–467 (May 23–26, 1989).

Robert M. Grey, "Vector Quantization," IEEE ASSP Magazine, vol. 1, No. 2, pp. 4–29 (Apr. 1984).

G. S. Kang et al., "Quality Imprvmnt of LPC–Processed Noisy Spch by Using Spectral Subt.," IEEE Trans. on Acoustics, Spch & Signal Proc., vol. 37, No. 6, pp. 939–942 (Jun. 1989).

*Primary Examiner*—Kee M. Tung
*Attorney, Agent, or Firm*—Blakely, Sokoloff, Taylor & Zafman

CEPSTRAL CORRECTION VECTOR QUANTIZER FOR SPEECH RECOGNITION

FIELD OF THE INVENTION

This invention relates to the field of speech recognition and more specifically to the recognition of speech in a non-stationary acoustic and noise environment by using vector quantization (VQ) techniques.

BACKGROUND OF THE INVENTION

Figure 1:
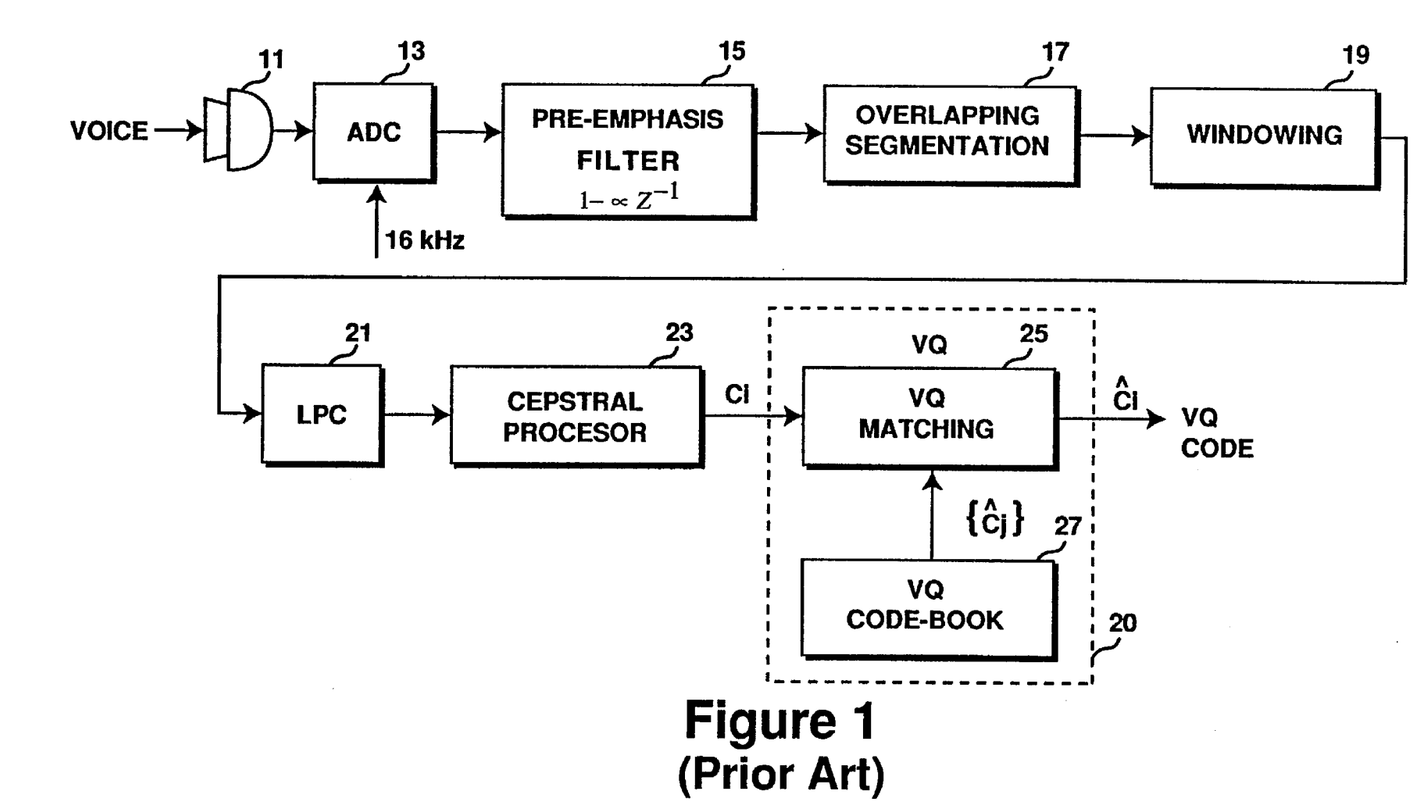
FIG. 1 is a functional block diagram of the front-end of a noise processing system.

FIG. 1 is a functional block diagram of the "front-end" of a voice processing system suitable for use in the encoding (sending) end of a vocoder system or as a data acquisition subsystem for a speech recognition system. (In the case of a vocoder system, a pitch extraction subsystem is also required.)

The acoustic voice signal is transformed into an electrical signal by microphone 11 and fed into an analog-to-digital converter (ADC) 13 for quantizing data typically at a sampling rate of 16 kHz (ADC 13 may also include an anti-aliasing filter). The quantized sampled data is applied to a single zero pre-emphasis filter 15 for "whitening" the spectrum. The pre-emphasized signal is applied to unit 17 that produces segmented blocks of data, each block overlapping the adjacent blocks by 50%. Windowing unit 19 applies a window, commonly of the Hamming type, to each block supplied by unit 17 for the purpose of controlling spectral leakage. The output is processed by LPC unit 21 that extracts the LPC coefficients $\{a_k\}$ that are descriptive of the vocal tract formant all pole filter represented by the z-transform transfer function $$\frac{\sqrt{\alpha}}{A(z)},$$

where $$A(z) = 1 + a_1 z^{-1} + a_2 z^{-2} \ldots + z_m z^{-m} \quad (1)$$

$\sqrt{\alpha}$ is a gain factor and, $8 \leq m \leq 12$ (typically).

Cepstral processor 23 performs a transformation on the LPC coefficient parameters $\{a_k\}$ to produce a set of informationally equivalent cepstral coefficients by use of the following iterative relationship $$c(n) = -\left[ a_n + \frac{1}{n} \sum_{k=1}^{n-1} (n-k) \cdot c(n-k) \cdot a_k \right] \quad (2)$$

where $a_O = 1$ and $a_k = 0$ for k>m. The set of cepstral coefficients, $\{c(k)\}$, define the filter in terms of the logarithm of the filter transfer function, or $$\ln = \frac{1}{2} \ln \alpha + \sum_{k=1}^{m} c(k) z^{-k} \quad (3)$$

For further details, refer to Markel, J. D. and Gray, Jr., A. H., "Linear Prediction of Speech," Springer, Berlin Heidelberg New York, 1976, pp. 229–233.

The output of cepstral processor 23 is a cepstral data vector, $C = [c_1 \, c_2 \ldots c_P]$, that is applied to VQ 20 for the vector quantization of the cepstral data vector C into a VQ vector, $\hat{C}$.

The purpose of VQ 20 is to reduce the degrees of freedom that may be present in the cepstral vector C. For example, the P-vector components, $\{C_k\}$, of C are typically floating point numbers so that each may assume a very large range of values (far in excess of the quantization range at the output of ADC 13). This reduction is accomplished by using a relatively sparse code-book represented by memory unit 27 that spans the vector space of the set of C vectors. VQ matching unit 25 compares an input cepstral vector $C_i$ with the set of vectors $\{\hat{C}_j\}$ stored in unit 27 and selects the specific VQ vector $\hat{C}_i = [\hat{c}_1 \, \hat{c}_2 \ldots \hat{c}_P]_i^T$ that is nearest to cepstral vector C. Nearness is measured by a distance metric. The usual distance metric is of the quadratic form $$d(C_i, \hat{C}_j) = (C_i - \hat{C}_j)^T W (C_i - \hat{C}_j) \quad (4)$$

where W is a positive definite weighting matrix, often taken to be the identity matrix, I. Once the closest vector, $\hat{C}_j$, of code-book 27 is found, the index, j, is sufficient to represent it. Thus, for example, if the cepstral vector C has 12 components, $[c_1 \, c_2 \ldots c_{12}]^T$, each represented by a 32-bit floating point number, the 384 bit C-vector is typically replaced by the index $i = 1, 2, \ldots, 256$ requiring only 8 bits. This compression is achieved at the price of increased distortion (error) represented by the difference between vectors $\hat{C}$ and C.

Obviously, generation of the entries in code-book 27 is critical to the performance of VQ 20. One commonly used method, commonly known as the LBG algorithm, has been described (Linde, Y., Buzo, A., and Gray, R. M., "An Algorithm for Vector Quantization," IEEE Trans. Commun., COM-28, No. 1 (January 1980), pp. 84–95). It is an iterative procedure that requires an initial training sequence and an initial set of VQ code-book vectors.

Figure 2:
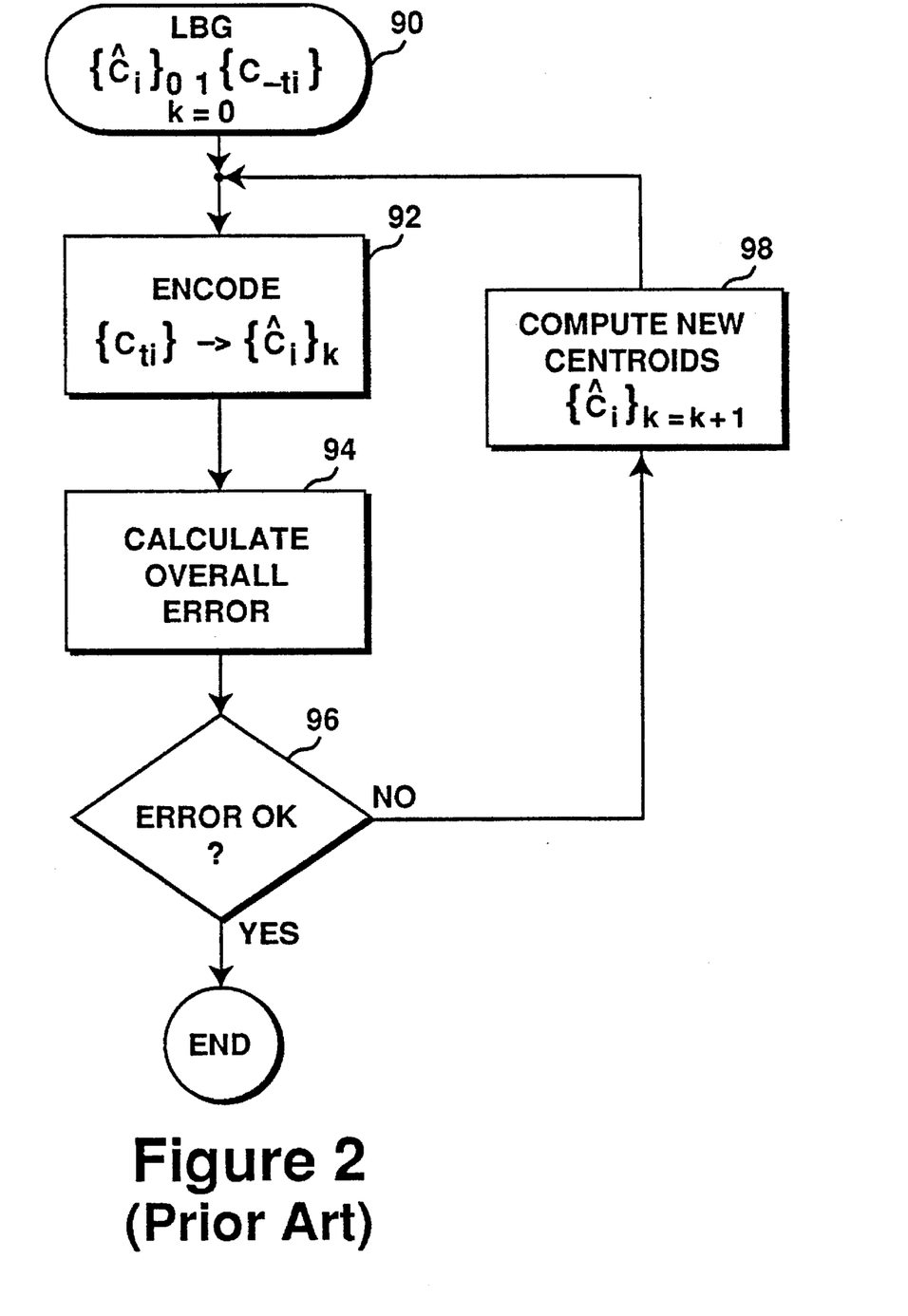
FIG. 2 is a flow diagram of the basic LBG training algorithm for generating a VQ code book.

FIG. 2 is a flow diagram of the basic LBG algorithm. The process begins in step 90 with an initial set of code-book vectors, $\{\hat{C}_j\}_O$, and a set of training vectors, $\{C_{ti}\}$. The components of these vectors represent their coordinates in the multidimensional vector space. In the encode step 92, each training vector is compared with the initial set of code-book vector. Step 94 measures an overall error based on the distance between the coordinates of each training vector and the code-book vector to which it has been assigned in step 92. Test step 96 checks to see if the overall error is within acceptable limits, and, if so, ends the process. If not, the process moves to step 98 where a new set of code-book vectors, $\{\hat{C}_j\}_k$, is generated corresponding to the centroids of the coordinates of each subset of training vectors previously assigned in step 92 to a specific code-book vector. The process then advances to step 92 for another iteration.

Figure 3:
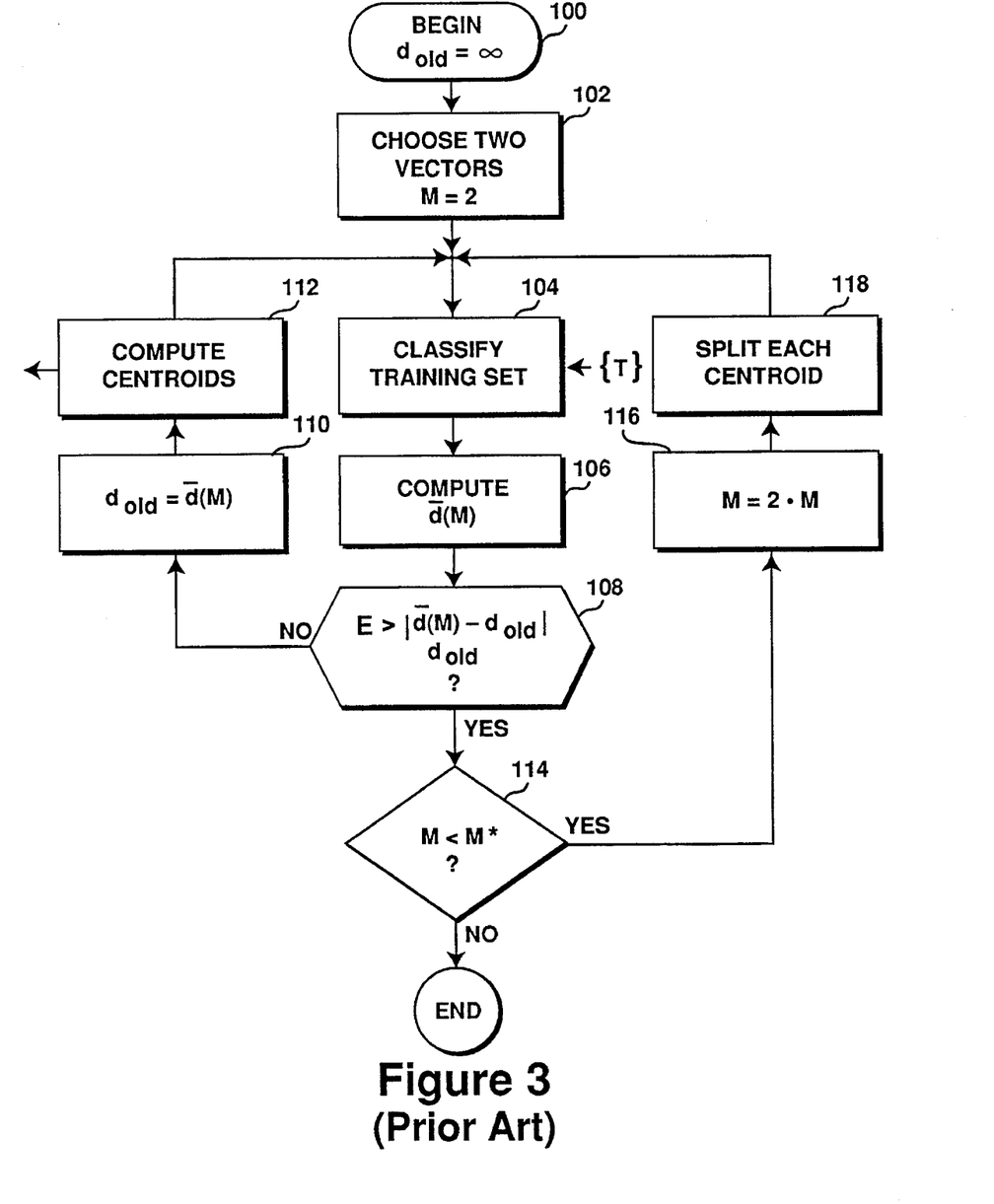
FIG. 3 is a flow diagram of a variation of the LBG training algorithm

FIG. 3 is a flow diagram of a binary tree variation on the LBG training algorithm in which the size of the initial code-book is progressively doubled until the desired code-book size is attained as described by Rabiner, L., Sondhi, M., and Levinson S., "Note on the Properties of a Vector Quantizer for LPC Coefficients," BSTJ, Vol. 62, No. 8, October 1983 pp. 2603–2615. The process begins at step 100 and proceeds to step 102, where two (M=2) candidate code vectors (centroids) are established. In step 104, each vector of the training set $\{T\}$, is assigned to the closest candidate code vector and then the average error $\{$distortion, $\bar{d}(M))$ is computed using the candidate vectors and the assumed assignment of the training vectors into M clusters. Step 108 compares the normalized difference between the computed average distortion, $\bar{d}(M)$, with the previously computed average distortion, $d_{old}$. If the normalized absolute difference does not exceed a preset threshold, $\epsilon$, $d_{old}$ is set equal to $\bar{d}(M)$ and a new candidate centroid is computed in step 112 and a new iteration through steps 104, 106 and 108 is performed. If threshold is exceeded, indicating a significant increase in distortion or divergence over the prior iteration, the prior computed centroids in step 112 are stored and if the value of M is less than the maximum preset value M*, test step 114 advances the process to step 116 where M is doubled. Step 118 splits the existing centroids last computed in step 112 and then proceeds to step 104 for a new set of inter-loop iterations. If the required number of centroids (code-book vectors) is equal to M*, step 114 causes the process to terminate.

The present invention may be practiced with other VQ code-book generating (training) methods based on distance metrics. For example, Bahl, et al. describe a "supervised VQ" wherein the code-book vectors (centroids) are chosen to best correspond to phonetic labels (Bahl, L. R., et al., "Large Vocabulary Natural Language Continuous Speech Recognition", Proceeding of the IEEE CASSP 1989, Glasgow). Also, the k-means method, or a variant thereof, may be used in which an initial set of centroids is selected from widely spaced vectors of the training sequence (Grey, R. M., "Vector Quantization", IEEE ASSP Magazine, April 1984, Vol. 1, No. 2, p. 10).

Once a "training" procedure such as outlined above has been used to generate a VQ code-book, it may be used for the encoding of data.

For example, in a speech recognition system, such as the SPHINX described in Lee, K., "Automatic Speech Recognition, The Development of the SPHINX System," Kluwer Academic Publishers, Boston/Dordrecht/London, 1989, the VQ code-book contains 256 vectors entries. Each cepstral vector has 12 component elements.

The vector code to be assigned by VQ 20 is properly determined by measuring the distance between each code-book vector, $\hat{C}_j$, and the candidate vector, $C_i$. The distance metric used is the unweighted (W=I) Euclidean quadratic form $$d(C_i, \hat{C}_j) = (C_i - \hat{C}_j)^T \cdot (C_i - \hat{C}_j) \quad (5)$$

which may be expanded as follows:

$$d(C_i, \hat{C}_j) = C_i^T \cdot C_i + \hat{C}_j^T \cdot \hat{C}_j - 2\hat{C}_j^T \cdot C_i \quad (6)$$

If the two vector sets, $\{C_i\}$ and $\{\hat{C}_j\}$ are normalized so that $C_i^T \cdot C_i$ and $\hat{C}_j^T \cdot \hat{C}_j$ are fixed values for all i and j, the distance is minimum when $\hat{C}_j^T \cdot C_i$ is maximum. Thus, the essential computation for finding the value $\hat{C}_j$ that minimizes $d(C_i, \hat{C}_j)$ is the value of j that maximizes $$\hat{C}_j^T \cdot C_i = \sum_{n=1}^{12} \hat{c}_{jn} \cdot c_{in} \quad (7)$$

The ability of speech encoding and recognition systems to function reliably is affected by the training data available as well as the environment in which the speech data is acquired. The quality of training data may be improved by increasing the variety of speakers used and the quantity of data used. However, variations in the acoustic environment which includes the acoustical properties of the rooms in which the speech sound is generated, the microphone and signal conditioning equipment, and the placement of the speaker will, in general, affect the performance of the speech recognition apparatus. Also, the presence of noise within the acoustical environment, such as created by typewriter, fan, and extraneous voice sources, will contribute to the unreliability of speech recognition.

Using increasing amounts of speech recognition training data that is representative of each of the possible combinations of acoustic environment variations and noise combinations should improve speech recognition but, as a practical matter, the ability to predict all of the combinations of environmental and noise characteristics that may be encountered is limited and the number of possible combinations are so large that if is desirable to find an adaptive robust means for adjusting the recognition process as the actual noise and acoustical environment is encountered.

It has been demonstrated that the two major factors that degrade the performance of speech recognition systems using desktop microphone in normal office environments are noise and unknown filtering (Liu, et al, "Efficient Joint Compensation of Speech for the Effects of Additive Noise an Linear Filtering," IEEE, ICASSP-92, Mar. 23–26, 1992, San Francisco, Calif., Vol. 1, pp. I-257-I-260.) It has also been shown that the simultaneous joint compensation for the effects of additive noise and linear filtering is needed to achieve maximal robustness with respect to these acoustical signal differences between training and testing environments [Acero, et al., "Environmental Robustness in Automatic Speech Recognition," IEEE ICASSP-90, April 1990, pp. 849–852]. This precludes the cascading of processes for dealing with additive noise and convolutional distortion.

The conventional (prior art) method for dealing with noise uses a spectral subtraction technique in which the noise spectrum is estimated during the "silence" interval between speech segments and is subtracted from the noise spectrum of the noisy speech. These methods generally lead to problems in estimating the speech spectrum because they can introduce negative spectral values [Hermansky et al., "Recognition of Speech in Additive and Convolutional Noise Based on RASTA Spectral Processing," IEEE ICASSP-93, April 1993, Minneapolis, Mich., Vol. II, pp. II-83-II-86]. Ad hoc procedures are required to eliminate negative coefficients.

Hermansky et al. further argue that the correction can be done in the spectral domain by filtering out the very low frequency components because they are due to relatively stationary features not attributable to speech, and filtering out non-speech high frequency components reflecting activity occurring faster than the ability of humans to manipulate their speech articulators. This technique may be suited for stationary linear convolutional noise and stationary additive noise effects by providing a coarse correction which is the same regardless of the spoken utterance but does not provide for adaptation to a non-stationary acoustic and noise environment.

An approach to cepstral correction based on classifying (grouping) the speech frames by their respective signal-to-noise ratio for both training and testing data is described by Liu et al. (op. cit.). Once the speech frames are grouped, the mean cepstral vector for each group is computed and a histogram of the number of frames per group is constructed for both the training set and the testing set. The histograms are then aligned using dynamic time-warping techniques in order to determine a correspondence between the groups of training data and the test data. The corrections are found by subtracting the mean vector of the test data from the mean vector of the training data for each corresponding group.

New data is corrected by determining the signal-to-noise ratio of each new frame of speech and applying the correction, previously computed, that corresponds to the determined signal to noise ratio. This technique requires the accumulation of a large amount of test data because every signal-to-noise ratio group must be determined together. This requirement results in slow adaptation. Also, if one or more signal-to-noise ratio groups do not have many exemplars, the dynamic time warping alignment and subsequently determined corrections may be inadequately computed.

The present invention, using test data more efficiently, increases the rate of adaptation by using a multistage correction process wherein an initial coarse correction is applied and then refined. Both the coarse and refined corrections adapt and model the actual current acoustic and noise conditions.

SUMMARY AND OBJECTS OF THE INVENTION

A cepstral vector quantization (VQ) speech processing system is based on training in one acoustic environment and use in a different environment by adaptively generating a coarse correction vector for the test cepstral vector followed by a finer correction vector. The correction method is based on the use of a binary tree VQ classifier that permits the correction vectors to be applied at an appropriate binary tree level, based on the amount of test data available to properly differentiate the test environment from the training environment. Initially, when test data is scarce, the corrective vectors are of the first level of the VQ binary tree and a single correction vector is applicable to all cepstral vectors. As data accumulates sets of fine correction vectors may be computed for each binary tree level, the number of possible correction vectors doubling each time the amount of available data doubles.

DETAILED DESCRIPTION

Changes in acoustical environment, particularly in the presence of additive uncorrelated noise, introduce errors into VQ based speech processing systems.

"Acoustic environment" is a phrase that encompasses the chamber (or lack-of chamber) in which the speech is generated and captured by a microphone, including all of the acoustic modifying affects such as reverberation, as well as differences in acoustic transmission transfer functions of microphones and associated electronics.

The cepstral affects of the acoustic environment are additive in the absence of any significant additive noise. However, when noise is present, the combined cepstral affects are no longer additive, forming instead a nonlinear combination of the acoustic environment characteristics and the additive noise.

If the speech processing system is only used in the original training environment, no correction would be required prior to the VQ operation. However, if the speech processing system is used in a test environment that is not the same as the training environment, a means for adapting the cepstral correction vectors to the new or changing environment is required.

Two general types of cepstral normalization have been described in the literature (Acero et al, 1990, op. cit.): signal-to-noise-ratio (SNR) dependent cepstral normalization (SDCN) and VQ code word dependent cepstral normalization (CDCN). Both CDCN and SDCN are not readily adapted for use in a non-stationary environment or for use in a large variety of environments that do not permit exhaustive training. It is desirable to have a VQ speech processing system that adaptively adjust the test cepstral vector.

A widely accepted model for a voiced speech signal, v(t), is given by $$v(t) = p(t) * x(t) \qquad (8)$$

where p(t) is the vocal fold excitation signal, x(t) is the filter impulse response function representing the vocal tract and * represents the convolution operator. Thus, v(t) is generated by the vocal fold excitation signal, p(t), driving the vocal tract represented by the impulse response function, x(t).

If the speech signal, v(t), is acoustically distorted by the environment and is corrupted by uncorrelated additive noise an environmentally degraded speech signal, y(t), can be modeled as $$y(t) = v(t) * h(t) + n(t) \qquad (9)$$

where h(t) represents the impulse response of the acoustic environment. The corresponding power spectral density (PSD) of y(t), $S_{yy}(\omega)$, is given by $$S_{yy}(\omega) = S_{vv}(\omega) \cdot |H(\omega)|^2 + S_{nn}(\omega) \qquad (10)$$

where $S_{vv}(\omega) = S_{pp}(\omega) \cdot S_{xx}(\omega)$ is the PSD of v(t), $S_{pp}(\omega)$ is the PSD of p(t), $S_{xx}(\omega)$ is the PSD of x(t), $S_{nn}(\omega)$ is the PSD of n(t), and $H(\omega)$ is the transfer function corresponding to h(t).

The log-spectrum corresponding to eq. (10) may be expressed as $$\ln S_{yy}(\omega) = \ln S_{vv}(\omega) + \ln |H(\omega)|^2 + \ln\left(1 + \frac{S_{nn}(\omega)}{S_{vv}(\omega)|H(\omega)|^2}\right) \qquad (11)$$

where ln represents the natural logarithm operator.

The cepstrum is defined as the inverse Fourier transform (IFT) of the log-spectrum so that taking the IFT of equation (11) yields the cepstrum of y(t), $C_{yy}(\tau)$, as $$C_{yy}(\tau) = C_{vv}(\tau) + C_{hh}(\tau) + IFT\left\{\ln\left(1 + \frac{S_{nn}(\omega)}{S_{vv}(\omega)|H(\omega)|^2}\right)\right\} \qquad (12)$$

where $C_{vv}(\tau) = C_{pp}(\tau) + C_{xx}(t)$ $C_{pp}(\tau)$ is the vocal fold excitation, p(t), cepstrum, $C_{xx}(\tau)$ is the vocal tract, x(t), cepstrum, $C_{hh}(\tau)$ is the acoustic environment impulse response, h(t), cepstrum, and IFT{·} represents the inverse Fourier transform of the function within the brackets.

The first two terms on the right side of eq. (12) are a linear combination of excitation, vocal tract and acoustic environment cepstrums and a nonlinear term, IFT{·}. The bracketed term, IFT{·}, represents a nonlinear combination corresponding to the natural logarithm of a signal-plus-noise to signal term where the "signal" corresponds to the combined voiced signal, v(t) acoustically modified by h(t) and represented in equation (12) by $S_{vv}(\omega) \cdot |H(\omega)|^2$.

In practice, all signals are sampled in time and frequency so that spectra, cepstra and time-domain functions are represented by discrete sampled functions or vectors and the Fourier transform and inverse Fourier transform is replaced by the discrete Fourier transform (DFT) and the inverse discrete Fourier transform IDFT, respectively.

Referring again to equation (12) it should be noted that in the absence of additive noise, $S_{nn}(\omega)=0$, so that $$C_{yy}(\tau) = C_{vv}(\tau) + C_{hh}(\tau) \quad (13)$$
$$= C_{pp}(\tau) + C_{xx}(\tau) + C_{hh}(\tau)$$

Because all of the terms on the right are additive (linear combination), pitch may be determined because $C_{pp}(\tau)$ will tend to be concentrated at a value of $\tau=\tau_p$, the pitch period. Thus, if the cepstral vector elements in the vicinity of $\tau p$ are subtracted, a modified cepstrum, $C_{zz}(\tau)$, results that is approximately given as $$C_{zz}(\tau) \approx C_{yy}(\tau) - C_{pp}(\tau) + C_{hh}(\tau) \quad (14)$$

Thus, the Fourier transform of equation (14) is $$ln S_{zz}(\omega) = ln S_{xx}(\omega) + ln|H(\omega)|^2 \quad (15)$$

which represents the sum of the formant log-spectrum and the acoustic distortion log-spectrum.

The removal of the effects of pitch is desirable because it makes the spectrum or cepstrum more speaker independent in voice processing systems (vocoders and speech recognition systems). However, it should be recognized that other methods have been used to remove the effects of pitch, notably by using the popular LPC technique.

Because the acoustic distortion caused by $H(\omega)$ tends to primarily produce an overall gain distortion, often referred to as "spectral tilt", the effect of which is generally concentrated in the low order cepstral coefficients $\{C_{hh}(\tau)\}_{\tau \to 0}$ where the value of the $C_{xx}(\tau)$ coefficients tend to be large.

In general, the additive term in the brackets cannot be ignored. This term is a nonlinear function of all the signal parameters.

For example, if $\epsilon(\omega) = S_{nn}(\omega)/S_{vv}(\omega) \cdot |H(\omega)|^2$, then $$ln(1 + \epsilon(\omega)) = \epsilon(\omega) - \frac{1}{2} \epsilon^2(\omega) + \frac{1}{3} \epsilon^3(\omega) - \ldots, \quad (17)$$

and if $\epsilon(\omega) << 1$ for all values of $\omega$, then $$ln(1+\epsilon(\omega)) \approx 0. \quad (18)$$

so that $$IFT\{ln(1+\epsilon(\omega))\} \approx 0 \quad (19)$$

and, by eq. (12), $$C_{yy}(\tau) \approx C_{vv}(\tau) + C_{hh}(\tau) \quad (20)$$

Under most other cases, $C_{zz}(\tau)$, the cepstrum after pitch removal, is given by $$C_{zz}(\tau) = C_{yy}(\tau) - C_{pp}(\tau)$$

or $$C_{zz}(\tau) = C_{xx}(\tau) + C_{hh}(\tau) + IFT\{ln(1+\epsilon(\omega))\} \quad (21)$$

which includes the nonlinear function of $\epsilon(\omega)$ which must be studied for the combined nonlinear effects of acoustic distortion and additive noise.

In the all-pole model for the acoustic tube that produces the speech formants, the filter z-transform, F(z), representing the transfer function is $$F(z) = \sqrt{\alpha} / A(z) = \sqrt{\alpha} / (1 + a_1 z^{-1} + a_2 z^{-2} + \ldots + a_m z^{-m}) \quad (22)$$

or in factored form $$F(z) = \sqrt{\alpha} / \prod_{k=1}^{m} (1 - b_k z^{-1}) \quad (23)$$

The complex cepstrum $\hat{f}(n)$ is then defined in terms of the natural logarithm of F(z), or $$ln F(z) = \frac{1}{2} ln\alpha - \sum_{k=1}^{m} ln(1 - b_k z^{-1}) \quad (24)$$

Because the filter is stable, all poles are within the unit circle of the z-plane so that because $$ln(1 - b_k z^{-1}) = \sum_{n=1}^{\infty} \frac{b_k^n}{n} z^{-n}, \quad |z| > |b_k|, \quad (25)$$

$$ln F(z) = \frac{1}{2} ln\alpha + \sum_{n=1}^{\infty} \sum_{k=1}^{m} \frac{b_k^n}{n} z^{-n}, \quad (26)$$

where n is the discrete time index.
Let $$C(n) = \sum_{k=1}^{m} \frac{b_k^n}{n} \quad (27)$$

so that $$ln F(z) = \frac{1}{2} ln\alpha + \sum_{n=1}^{\infty} C(n) z^{-n} \quad (28)$$

As a result, the discrete cepstrum, $\hat{f}(n)$, corresponding to F(z) is $$\hat{f}(n) = \begin{cases} c(0) = \frac{1}{2} ln\alpha & \text{for } n = 0, \\ c(n) & \text{for } n > 0, \\ 0 & \text{for } n < 0 \end{cases} \quad (29)$$

The cepstral coefficients, $\{C(n)\}$, may be defined recursively by equation (2) in terms of the denominator polynomial coefficients, $\{a_p\}$, of F(z) as shown in equation (22).

A similar definition for the cepstrum corresponding to the squared magnitude spectrum $|F(z)|^2$, for which the cepstrum is defined as the inverse z-transform of $ln|(z)|^2$ so that $$\hat{f}(n) = \begin{cases} c(0) = ln\alpha & \text{for } n = 0, \\ c(n) & \text{for } n > 0, \\ c(-n) & \text{for } n < 0 \end{cases} \quad (30)$$

The zero-order cepstral coefficient, c(O), is a gain term and is an indication of the logarithm of energy for a fixed pole distribution as defined by the terms of the denominator polynomial A(z).

Other possible definitions of cepstral vectors include those vectors based on the inverse Fourier transform of the log-magnitude of the power spectrums with non-uniform spectral analysis bandwidths such as the mel-scale spectrum or log-frequency scale spectrum, which have been found effective in speech classification applications.

In summary, re-writing equation (12) by removing the pitch term, $Cpp(\tau)$, a modified cepstrum results as follows:

$$C_{zz}(\tau) = C_{yy}(\tau) - C_{pp}(\tau) \quad (31)$$

or $$C_{zz}(\tau) = C_{xx}(\tau) + C_{hh}(\tau) + IFT\{ln(1+\epsilon(\omega))\}$$

where $\epsilon(\omega)=S_{nn}(\omega)/S_{vv}(\omega)\cdot|H(\omega)|^2$

If LPC coefficients are used to derive the coefficients $\{a_k\}$ of the denominator polynomial, $A(z)$, as in equation (24) or its equivalent factored form in equation (25), from which a cepstrum is computed as described by equation (2) or by equations (28) and (29), the cepstral term for pitch is not included in the cepstrum so that in explicit removal of $C_{pp}(\tau)$ is required.

Examination of equation (31), in light of equation (17)–(19) reveals that for large signal-to-noise ratios $(\epsilon(\omega)\ll 1)$ $$C_{zz}(\tau)\approx C_{xx}(\tau)+C_{hh}(\tau) \tag{32}$$

so that the error in $C_{zz}(\tau)$ is mainly due to $C_{hh}(\tau)$ which results from the environmental acoustic distortion transfer function $H(\omega)$. If $H(\omega)$ is different than the training environment transfer function used to generate the VQ code book, $C_{hh}(\tau)$ will introduce an error in the cepstral vector corresponding mainly to a difference in spectral tilt.

At very low signal-to-noise ratios $(\epsilon(\omega)\gg 1)$ equation (31) becomes $$C_{zz}(\tau)\approx C_{nn}(\tau) \tag{33}$$

so that the error is mainly due to an additive noise cepstral vector.

At signal-to-ratios between these extremes, a combination of spectral tilt spectral error and nonlinear error represented by $\ln(1+\epsilon(\omega))$ will contribute an error vector to the cepstral vector which is a function of the signal-to-noise ratio.

As previously stated a multistep correction process is used in correcting the cepstral vector derived from a test environment that differs from the training environment. The first correction step involves the computation of an average cepstral vector, $\overline{C}$, from a sequence of cepstral vectors belonging to the new environment. Thus, if the sequence of cepstral vectors is $C_1, C_2, \ldots, C_j, \ldots, C_K$, the average is given by $$\overline{C}_k = \frac{1}{k}\sum_{j=1}^{k} C_j \tag{34}$$

Alternatively, a moving average, such as the exponentially discounted moving average, $\overline{C}_k$, given by $$\overline{C}_k = \alpha \overline{C}_{k-1} + (1-\alpha)C_k \tag{35}$$

may be used, where $0<\alpha<1$ and $\overline{C}_{k-1}$ is the prior average.

The number of cepstral vectors used to estimate $\overline{C}_k$ in equation (34) has to be sufficient to ensure that $\overline{C}_k$ represents a statistically stable estimate of the average environmental (non-speech) acoustic contributions. Similarly, the moving average of equation (35) must incorporate sufficient degrees-of-freedom (DOF) in order to provide a stable estimate. In the latter case, the DOF is controlled by the exponential discount factor, $\alpha$. The lower the value of $\alpha$, the lower the DOF. More specifically:

$$DOF=(1+\alpha)/(1-\alpha)$$

or $$\alpha=(DOF-1)/(DOF+1) \tag{36}$$

This implies that an exponentially discounted average based on a value of $\alpha=49/51$ is required to provide an estimate with stability comparable to an unweighted average of 50 independent vectors using the form of equation (34). Thus, a unweighted moving average of 50 vectors would have comparable statistical stability to the long term exponentially weighted average using $\alpha=49/51=0.96$. The exponentially weight form, however, is more conveniently computed.

The coarsely corrected $k^{th}$ vector, $\hat{C}_k$, is given by $$\hat{C}_k = C_k - \overline{C}_k \tag{37}$$

The rationale behind this correction is based on the fact that voiced speech signals tend to have varying formant frequencies from one frame to the next (where a frame is typically a representation of 20 ms. of acoustic data). This implies that the spectral formant peaks will tend to shift from one frame to the next so that the cepstral coefficients representing the inverse Fourier transform of the log-magnitude spectrum will be representative of differing frequencies from one cepstral vector to the next. The average, $\overline{C}_k$, is related to the logarithm of the geometric mean of the spectra of the speech data frames making-up the average of equation (34). The averaging tends to reinforce the consistent contributions to the cepstral vector due to the environmental contributions that are more consistent than the speech related data. For example, a rotating fan would tend to have a constant rotational rate that produces harmonically related frequency components determined by the rotational rate and fan blade configuration. These characteristics are reasonably stable from one data frame to the next. Hence, by subtracting, $\overline{C}_k$, in equation (36), $\hat{C}_k$ becomes a better representation of the speech data.

Having computed that cepstral vector, $\hat{C}_k$, representing the $k^{th}$ frame of speech data with reduced environment affects, the vector, $\hat{C}_k$, may be passed on to a recognition (classifying) system, such as a VQ unit for finding the code-book vector that most closely resembles $\hat{C}_k$. For example, the VQ subsystem 20 of FIG. 1, finds the codebook index, z, that satisfies the condition $$z = \min_{z} D(\hat{C}_k - C_z) \tag{38}$$

where $D(\bullet)$ is a distance measure of the argument (.), that represents the distance between $\hat{C}_k$ and the codebook vector z. The value of z, corresponding to the minimum, is the codebook index corresponding to vector $C_z$. Typically, codebook vectors have 12 elements of 32-bit floating-point numbers, and $0<z<255$. The vector $C_z$ represents the centroid (or average) of the cluster of training vectors associated with $C_z$.

Figure 4:
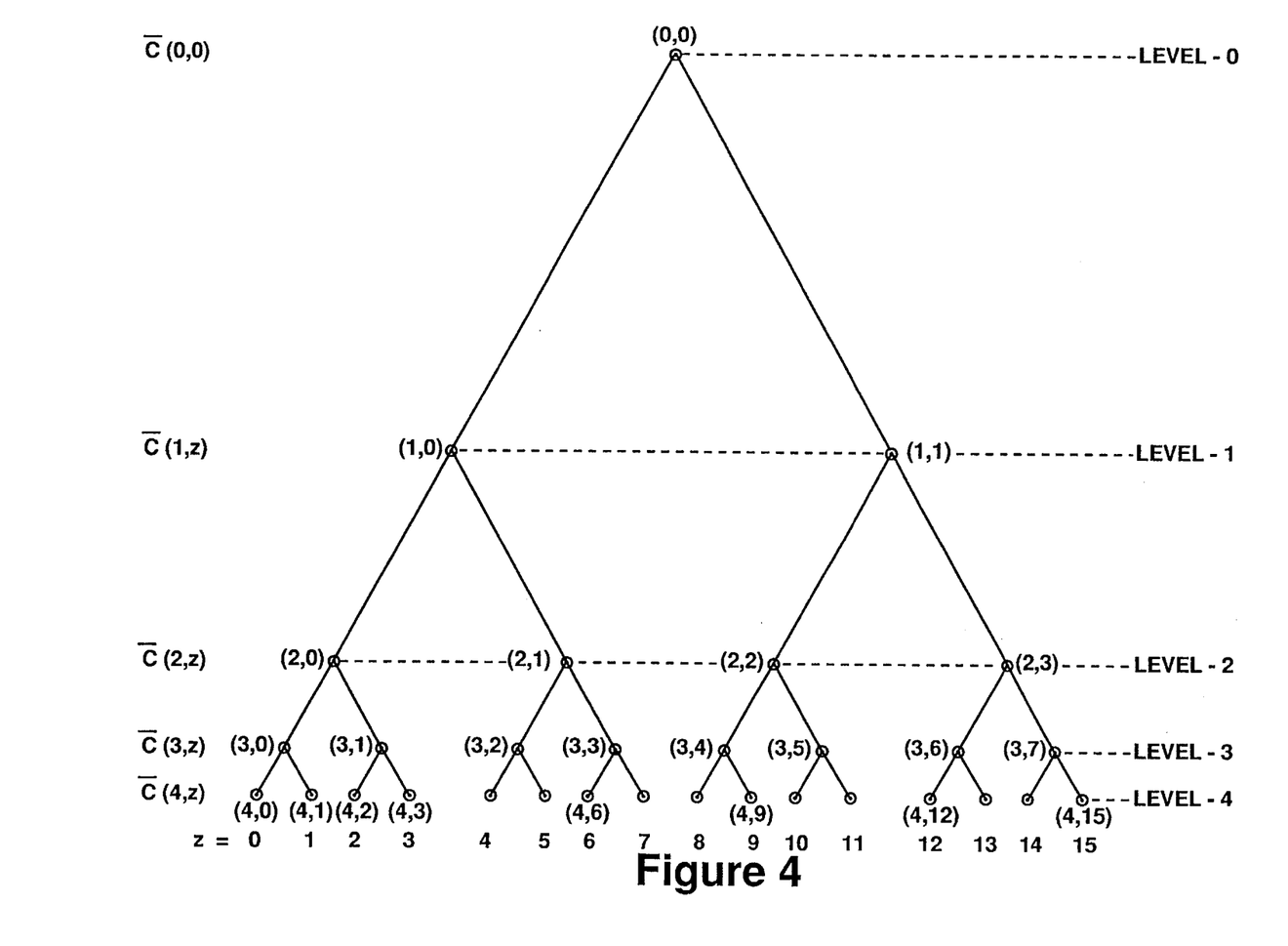
FIG. 4 shows a binary-tree vector quantization (VQ) structure.

FIG. 4 shows the structure of a VQ binary-tree. In constructing the binary tree, as described previously with reference to FIG. 3, a set of coarsely corrected training cepstral data vectors, $\{\hat{C}_k\}$, is collected and is represented by the centroid represented by the vector $(0, 0, \ldots, 0)$ corresponding to the node located at $(0,0)$ which represents binary tree level 0 and codebook index 0. The initial set of vectors is then split into two clusters corresponding to nodes $(1,0)$ and $(1,1)$. Each cluster location is represented by the centroid, or average, of the vectors in each cluster. The number of clusters doubles at each increasing level but the number of member cepstral vectors in each cluster tends to approximately decrease by a factor of two. Consequently, the number of levels that can be reasonable accommodated is limited by the amount of data available. In order to ensure a reasonably stable classification at a given level, it is typically required that a reasonable number of sample vectors (say 50) make-up each cluster before proceeding to the next level.

Following the VQ binary tree strategy, it would be reasonable to extend the vector correction procedure given by equations (34) through (37) with the binary tree structure of FIG. 4. The coarse correction procedure previously described corresponds to a level-0 correction because the centroid of all uncorrected test cepstral vectors is simply the average of the vectors. The centroid is the point in the multi-dimensional space represented by the coordinates corresponding to the cepstral vector elements, and having coordinates that are the arithmetic means of the coordinates of all points making up the cluster.

The coarse correction vector, $\overline{C}_k$, represents the quasi-stationary non-speech acoustical environment and is applied to input vector $C_k$, in equation (36), to produce $\hat{C}_k$, and may be used as a basis for correcting cepstral data vectors produced in a different environment. This ability is important because speech recognition apparatus undergoes extensive training in any particular environment that often involves hundreds of thousands of training vectors. Because retraining from scratch can be both costly and time consuming, it is highly desirable to have an adaptive mechanism for correcting cepstral speech vectors for different acoustical environment effects.

In other words, the single coarse correction of equation (37) corrects for quasi-stationary non-speech related effects in a given environment. A change in the quasi-stationary effects would not be properly corrected using the single coarse adjustment from a given environment. An adaptive method permits additional (finer) corrections to the coarse corrections to be made, the quality of improvement increasing with time as more data from the changed environment is acquired.

The basic outline to this adaptive process involves the following steps:

(1) in the original training environment,
   (a) computing the coarse correction vector $\overline{C}_k$ as in equation (35) and (37),
   (b) constructing a binary-tree VQ codebook from the set of coarsely corrected vectors, $\{\hat{C}_k\}$, as in equation (37);
   (c) storing the centroids $\{\overline{C}(I,z)\}$ associated with each binary tree node at level I and codebook index z; and (2) in the changed (test) environment,
   (a) acquiring cepstral data vectors, $\{C_x\}$,
   (b) computing a running average, $\hat{C}_x(0,0)$, of acquired cepstral data vectors which is representative of the quasi-stationary non-speech acoustical test environment,
   (c) correcting each cepstral data vector, $C_x$, to produce a coarsely corrected vector $\hat{C}_x = C_x - \overline{C}_k$, (d) VQing coarsely corrected vector $\hat{C}_x$ using the binary-tree VQ codebook from step (1)(b), yielding a VQ vector, $\overline{C}(I,z)$, from binary-tree level I and codebook index z, that most closely resembles $\hat{C}_x$,
   (e) accumulating $\hat{C}_x$ at each node that $\hat{C}_x$ quantizes to, forming a running average test centroid, $\overline{C}_x(I,z)$, and incrementing a count, $n_{I,z}$, indicating the number of vectors contributing to the mean, $\hat{C}_x(I,z)$,
   (f) computing a correction vector, $\Delta$, representative of the difference in speech acoustic environments, where $\Delta = \hat{C}(I,z) - \hat{C}_x(I,z)$, and
   (g) fine correcting VQ vector $\hat{C}_x$ to yield a finely corrected vector $\check{C}_x$, suitable for subsequent use in the speech processing system, where $\check{C}_x = \hat{C}_x + \Delta$ Thus, by forming a running average of the test environment cepstral vectors, $\overline{C}_x(I,z)$, an estimate of the test environment speech related mean cepstral vector is formed progressively as each cepstral data is acquired. The difference between $\overline{C}_x(I,z)$ and $\hat{C}(I,z)$ are indications of the difference between the original training environment and the test environment which is determined by the closest VQ vector $\overline{C}(I,z)$ to yield a finely corrected vector, $\check{C}_x$, suitable for subsequent processing.

Figure 5:
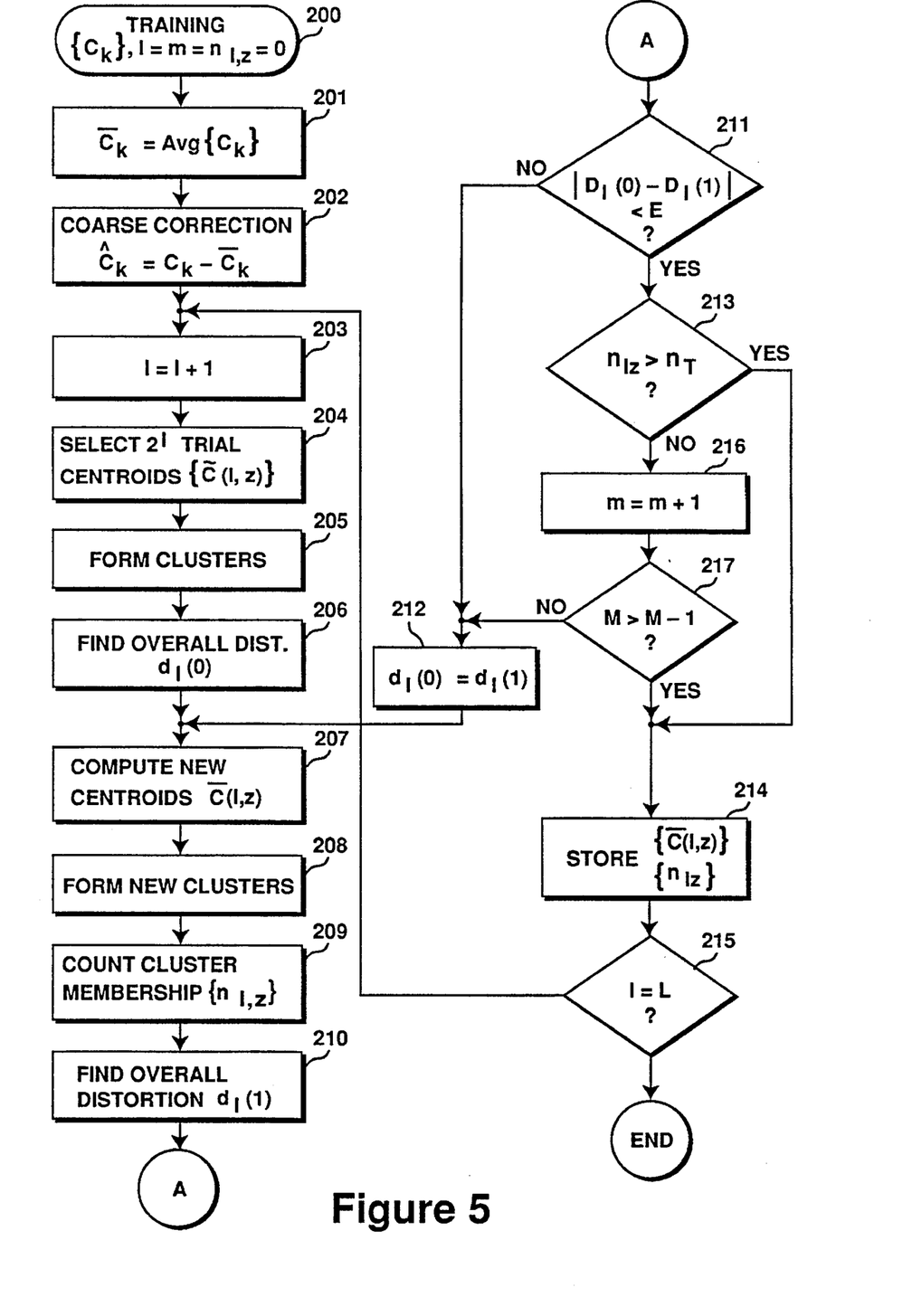
FIG. 5 is a flow diagram for computing a coarse correction vector and constructing a binary-tree VQ code book.

FIG. 5 is a flow diagram outlining the process of steps (1)(a) and (1)(b) in greater detail. The training process 200 begins with an initial set of training vectors, $\{C_k\}$, and a set of indices I, m, and $n_{I,z}$ set to zero. Step 201 computes the average $\overline{C}_k$ from the set $\{C_k\}$ which is applied as a correction to each $C_k$ in step 202 to yield a set of coarsely corrected vectors $\{\hat{C}_k\}$. The binary-tree level index, I, is incremented in step 203. In step 204, a set of $2^I$ trial centroids, $\{\hat{C}(I,z)\}$, are selected and each vector, $\overline{C}_k$, is assigned to the cluster associated with the closest trial centroid using a suitable distance metric. Step 206 applies a distortion measure for each cluster indicative of the variance between the cluster centroid vector and the vectors assigned to the cluster and computes an overall distortion number, $d_I(0)$, by combining the cluster distortion measures. A centroid for each cluster, $\overline{C}(I,z)$, is computed in step 207 by averaging the cluster members, i.e., $\hat{C}(I,z) = \mathrm{Avg}((\hat{C}_k(I,z))$ where $\overline{C}_k(I,Z)$ are the members of cluster (I,z) associated with node (I,z) of the binary tree. As a result of replacing the set of trial centroids of step 204 with the set $\{\overline{C}_k(I,z)\}$, step 208 re-assigns the set of vectors $\{C_k\}$ to clusters (I,z) with the closest centroids, $\hat{C}(I,z)$. Step 209, is an optional step that establishes a cluster membership count, $n_{I,z}$, that may be used for quality control of estimated centroid stability. Step 210, like step 206, computes an overall distortion measure, $d_I(1)$ for the new cluster set from step 208. A comparison is made in step 211 between the distortion measures $d_I(0)$ and $d_I(1)$ and a preset threshold $\epsilon$, to determine if the estimates have converged and, if so, the process proceeds to test step 213. Otherwise, the process goes to step 212 where the older distortion measure is updated and the process is returned to step 207 for another iteration. Step 213 compares each optional cluster count index, $n_{I,z}$, with a preset index, $n_T$, to determine if a sufficient number of vectors have been used to provide a stable centroid estimate and, if not, index m is incremented in step 217 and tested in step 217 to see if a preset maximum number of iterations has been exceeded. If the maximum, M, has not been exceeded, the process goes to step 212 and then to step 207 where a new set of centroids are introduced. If m≧M−1, then the process goes to step 214 where the set of $I^{th}$ level centroids, $\{\overline{C}(I,z)\}$ and the set of associated cluster counts, $\{n_{I,z}\}$ are stored. Step 215 tests if the $L^{th}$, or final, level of the binary tree has been created and, if not, returns to step 203. Otherwise, the process ends.

Figure 6:
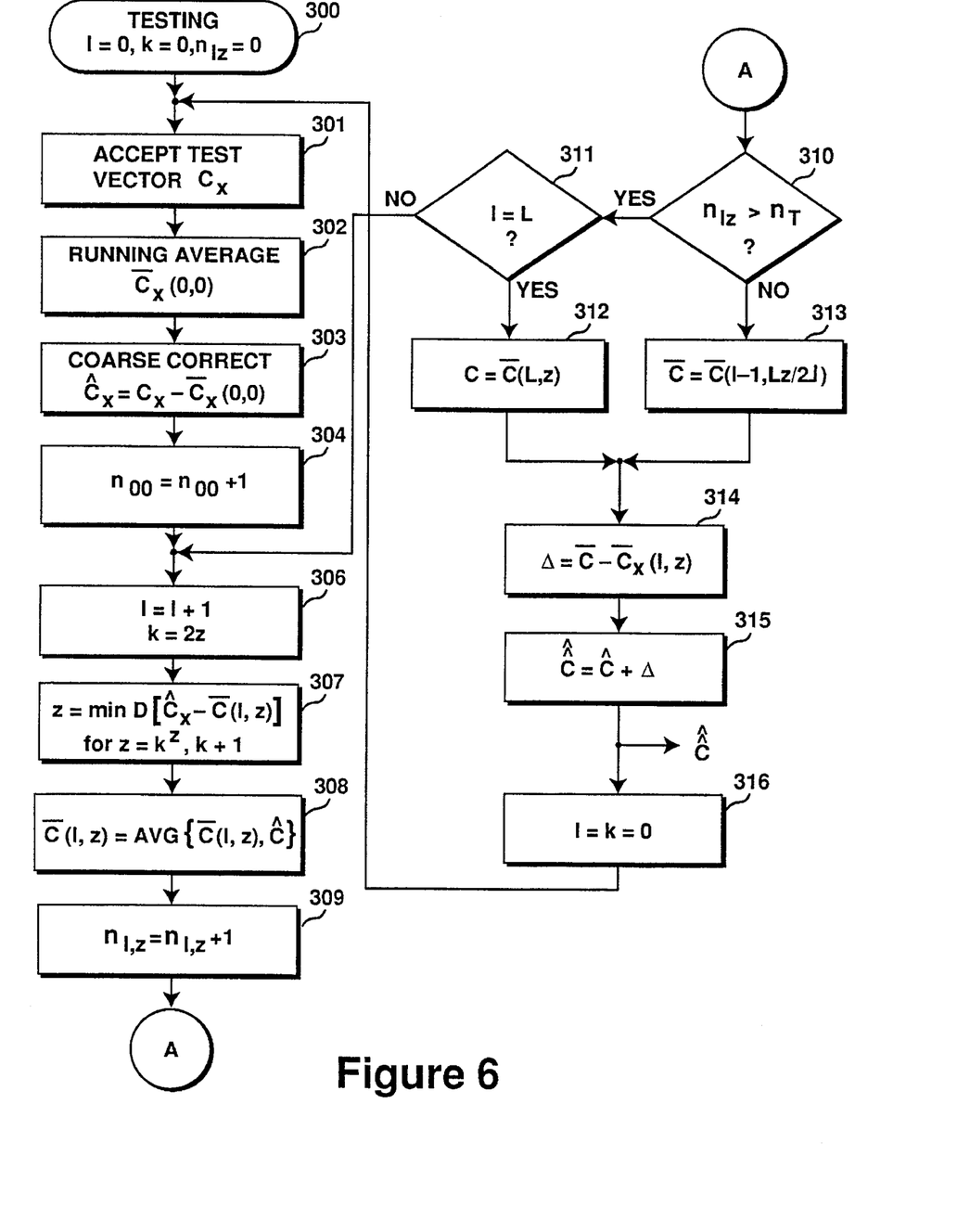
FIG. 6 is a flow diagram for the cepstral correction vector quantizer method.

FIG. 6 is a flow diagram detailing process 300 for correcting the test environment cepstral data vectors, $\{C_x\}$, using the results of the process of FIG. 5.

Process 300 is initialized by setting level index I=0, each cluster count index $n_{I,z}=0$, codebook index z=0, and dummy codebook index k=0. Test vector $C_x$, from the test environment, is acquired in step 301. A running average $\overline{C}_x(0,0)$, of test vectors $\{C_x\}$ is computed in step 302. A coarsely corrected vector, $\hat{C}$, is generated in step 303 so that $\hat{C}_x = C_x - \overline{C}_x(0,0)$, where $\overline{C}_x(0,0)$ is obtained from step 302. Cluster index $n_{0,0}$ is incremented in step 304. Step 306 increments level index, I, and sets dummy codebook index k=2z. Step 307 finds the centroid $\hat{C}(I,z)$ of the Ith level, as determined by process 200, that is closest to data vector C for values of z=k and z=k+1, representing the only choices through the binary tree from level I-1 to level when using a binary search pattern. Step 308 computes a new test centroid vector, $\hat{C}_x(I,z)$, by incorporating $\hat{C}_x$ into the running average and incrementing cluster count index $n_{I,z}$ in step 309. Step 310 checks if the cluster count exceeds threshold value $n_T$ and, if so, proceeds to test step 311 to determine if the maximum level, L, of the binary tree has been reached and, if not, returns to step 306. If the maximum level, L, has been reached, step 312 declares $\overline{C}(L,z)$ to be the VQ vector corresponding to $\hat{C}$. If, in step 310, the cluster count, $n_{I,z}$, does not exceed threshold, $n_T$, step 313 assigns centroid $\overline{C}((I-1), \lfloor z/2 \rfloor)$ corresponding to the node at level (I-1) and codebook index $\lfloor z/2 \rfloor$, where $\lfloor z/2 \rfloor$ indicates the integer portion of z/2. The process proceeds to step 314 in which a fine correction vector, Δ, is computed, by subtracting from $\overline{C}$ of step 312 or 313, the corresponding value $\overline{C}_x(I,z)$ for node (I,z) or (I-1, $\lfloor z/2 \rfloor$), producing the final corrected vector $\hat{C}_x$ in step 315. After re-initializing indices I, k and z in step 316, the process returns to step 301.

Figure 7:
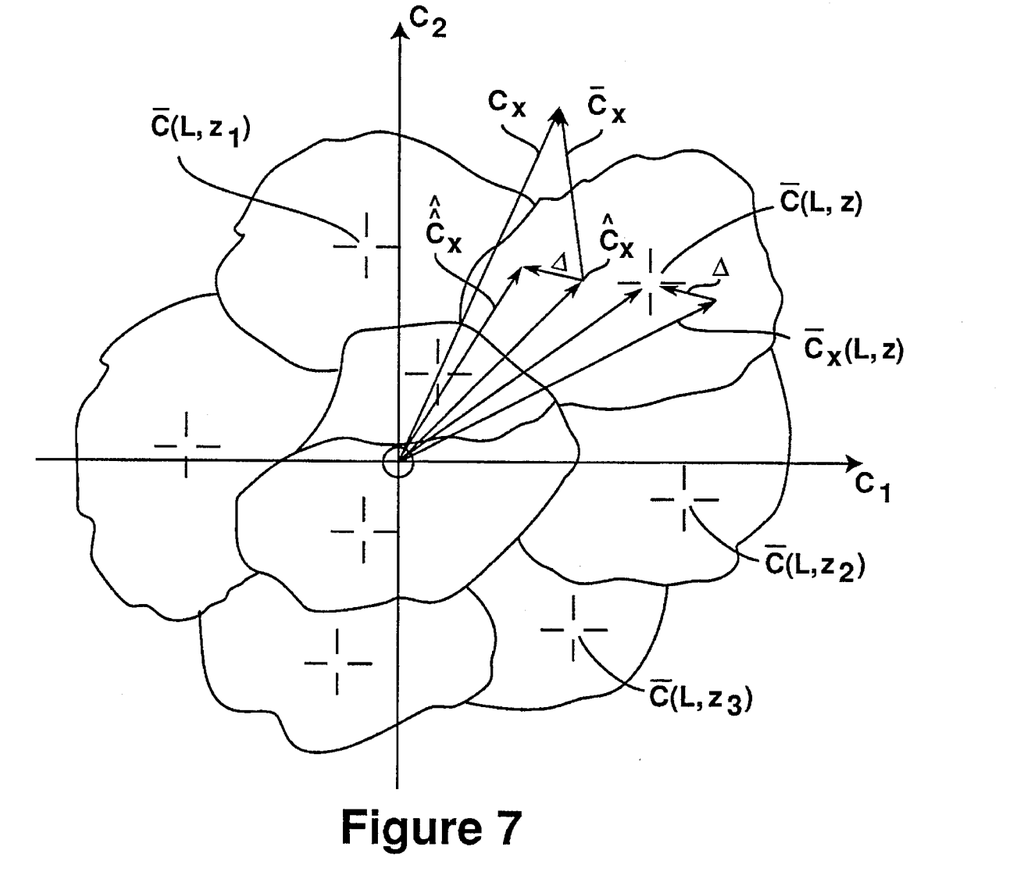
FIG. 7 is a two-dimensional representation of the correction method.

FIG. 7 is a two-dimensional representation of the correction method of FIGS. 5 and 6. The initial training data was corrected by subtracting the mean vector $\overline{C}_k$ leaving a zero mean cloud of points $(c_1, c_2)$ that represent the terminals of the vectors $\{\hat{C}_k\}$. The binary-tree VQ process partitioned the points into $2^L$ clusters with centroids $\{\overline{C}(L,z_n)\}$. When vector $\hat{C}$ was processed by subtracting $\overline{C}_x(0,0)$, the coarsely corrected vector $\hat{C}_x$ resulted. Processing $\hat{C}_x$ through the binary-tree VQ resulted in producing $\overline{C}(L,z)$ as the centroid closest to $\hat{C}_x$, which was then used to compute fine correction vector Δ which, when added to $\hat{C}_x$, obtains corrected vector $\hat{C}$.

Figure 8:
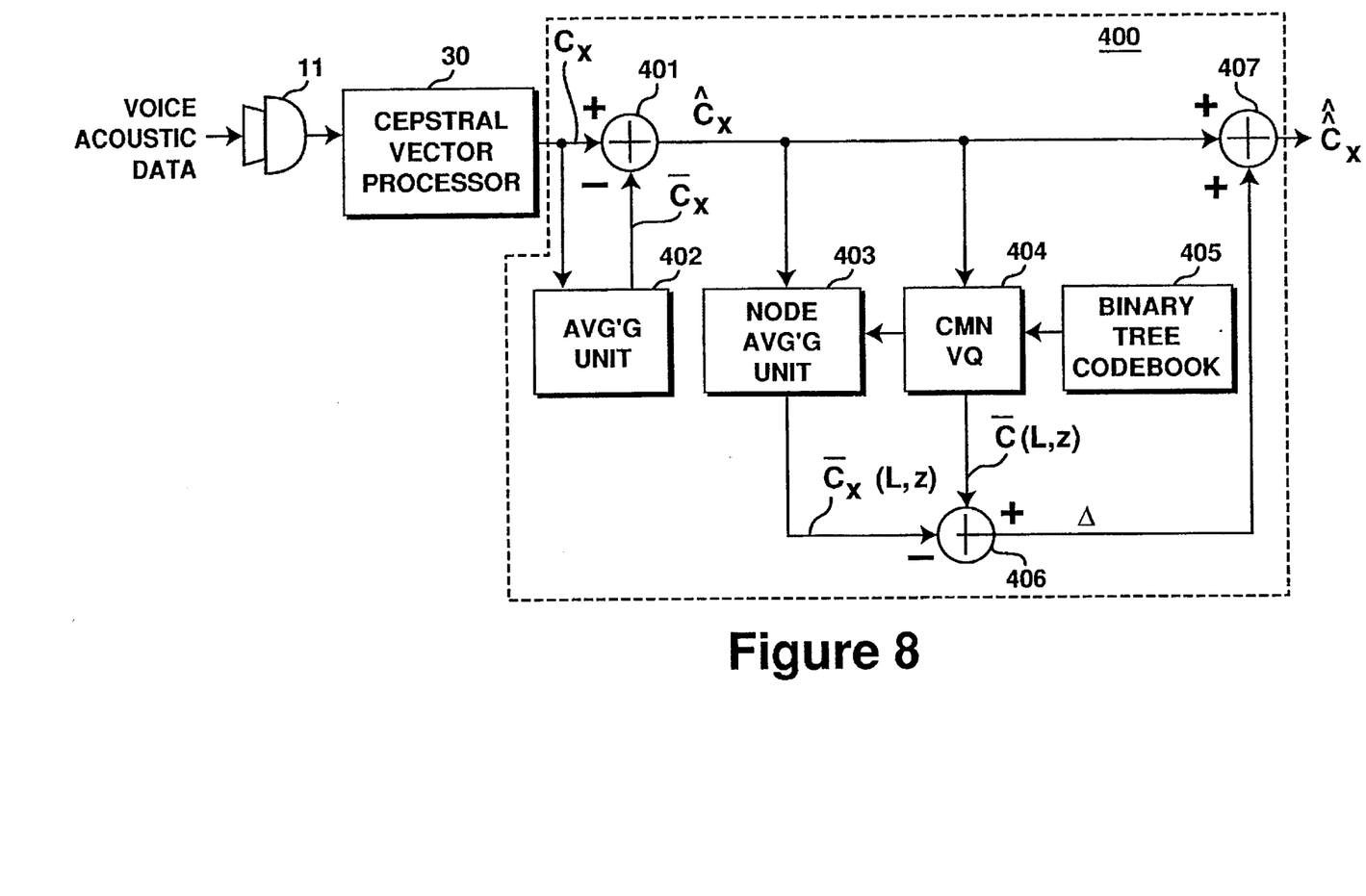
FIG. 8 is a block diagram of a cepstral mean-vector normalization and corrections system.

FIG. 8 is a block diagram of a cepstral mean-vector normalization (CMN) system 400 for generating a corrected vector $\hat{C}_x$ from an input vector $C_x$ using the methods of FIGS. 5 and 6. Acoustic data is captured by microphone 11 and processed by cepstral vector processor unit 30 that outputs a sequence of cepstral vectors, $\{C_x\}$, that are representative of the incoming acoustic data. A cepstral vector processor unit 30 output vector, $C_x$, is delivered to running average unit 402 that produces a running average, $\overline{C}_x$, of the set of cepstral vectors $\{C_x\}$. $C_x$ is also delivered to subtractor unit 401 where the difference $(C_x - \overline{C}_x) = \hat{C}_x$ is generated. The value of $\hat{C}_x$ is supplied to node averaging unit 403, CMN VQ unit 404 and adder unit 407. VQ unit 404, together with codebook 405, produces the VQ vector $\overline{C}(L,z)$ and instructs node averaging unit to form the corresponding running average vector $\overline{C}_x(L,z)$. Subtractor 406 forms the fine correction vector $\Delta = \overline{C}(L,z) - \overline{C}_x(L,z)$. The correction vector, Δ, supplied by subtractor unit 406 is added to $\hat{C}_x$ by adder unit 407 to form the fine corrected cepstral vector $\hat{C}$ that is outputted for use in a speech classifier or recognition system. The output vector, $\hat{C}$, is suitable for use in any recognition system including VQ based and continuous density speech recognition systems. Similarly, the input cepstral data vector, $C_x$, may be generating using any of the methods common to the art including those previously described.

It should be noted that those practicing the art will recognize that the procedures outlined for correcting cepstral vectors by reducing the effects of quasi-stationary non-speech acoustic signals may be practiced using different components and techniques than those used in the proceeding description. For example, the binary tree VQ codebook may be replaced by any VQ codebook based on other tree structures such as single-split trees. Also, the highly efficient binary tree search implied in step 307 of FIG. 6 can be replaced by a full search algorithm without departing from the intent and spirit of the invention.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for correcting a cepstral test vector representation of speech from an acoustical test environment using a vector quantizer (VQ) encoder having a VQ encoder codebook based on training data from a different acoustical training environment, the method comprising:

(a) applying a coarse correction vector from the cepstral test vector, the coarse correction vector being representative of the acoustical training environment without the presence of speech, for producing a coarsely corrected cepstral test vector; and (b) applying a fine correction vector to the coarsely corrected cepstral vector for producing a fine corrected cepstral test vector, the fine correction vector representative of a difference between acoustical test environment with the presence of speech only and the acoustical training environment cepstral training vectors with the presence of speech only.

2. The method of claim 1 wherein the coarse correction vector is an average of a set of cepstral test vectors generated in the acoustic test environment.

3. The method of claim 1 wherein the fine correction vector is representative of a difference between a VQ encoder codebook vector that is closest to a coarsely corrected cepstral test vector and a vector representative of a running average of test cepstral vectors that is closest to the VQ encoder codebook vector.

4. A method for correcting cepstral vectors representative of speech from an acoustical test environment for use in a speech processing system by using a vector quantization (VQ) codebook based on training data from an acoustical training environment, and by applying correction vectors to the cepstral vectors, the method comprising:

(a) acquiring a set of cepstral vectors representative of speech signals from the acoustical training environment;

(b) computing an average cepstral vector from the acquired set of cepstral vectors, the average cepstral vector representative of the acoustical training environment without speech;

(c) correcting the set of cepstral vectors by subtracting the average cepstral vector of step (b) from each of the acquired set of cepstral vectors of step (a) for producing a set of coarsely corrected vectors;

(d) generating a VQ codebook tree from the set of coarsely corrected vectors of step (c) in which each codebook tree node is a vector that is representative of a set of coordinates describing a centroid of a distinct cluster, each cluster having an assigned subset of the set of coarsely corrected vectors of step (c), the subset of coarsely corrected vectors in each cluster being closer to the centroid of the cluster to which the subset is assigned than to any other cluster;

(e) acquiring new cepstral vectors from a test environment and computing a running average test vector;

(f) correcting each new cepstral vector of from the test environment by (i) subtracting the running average cepstral vector from step (c) from each new cepstral vector to obtain a coarsely corrected new vector, (ii) vector quantizing the coarsely corrected new vector of step (f)(i) using the VQ codebook tree of step (d) to obtain a VQ vector, (iii) accumulating a running average node vector from a set of new vectors associated with a node of the VQ codebook tree to which each vector of the set of new vectors is closest, (iv) generating a fine correction vector from the VQ vector of step (f)(ii) by subtracting the running average node vector corresponding to the VQ vector node, (v) producing a finely corrected new vector by adding the fine correction vector to the coarsely corrected new vector; and (g) outputting the finely corrected new vector for processing by the speech processing system.

5. The method of claim 4, further comprising an adaptation method for correcting cepstral vectors, the adaptation method comprising:

(h) computing a new average cepstral vector by including in the average cepstral vector of step (b) the new cepstral vector; and (j) computing a new centroid for the cluster associated with the VQ vector of step (e)(ii) by including within the cluster the coarsely corrected new vector.

6. The method of claim 5, wherein both step (h) and step (j) use moving average techniques for computing the average cepstral vector and for computing the new centroid.

7. The method of claim 6 wherein the moving average technique is an exponentially discounted moving average technique.

8. A method for use in speech processing system for pre-processing a cepstral test vector that is representative of a speech signal in a test acoustical environment that can include extraneous quasi-stationary non-speech acoustic signals, the method reduces the extraneous signals by subtracting average cepstral vectors generated in a training acoustic environment and the test acoustical environment, the method comprises:

(a) generating correction means using a set of training cepstral vectors, including,
    (i) generating an average training vector from the set of training cepstral vectors,
    (ii) producing a set of mean normalized training vectors by subtracting the mean value corresponding to the average training vector,
    (iii) producing a vector quantization (VQ) codebook tree based on the set of mean normalized training vectors; and (b) acquiring and correcting each vector of a sequence of cepstral test vectors, including,
    (i) generating a running mean cepstral test vector from the sequence of cepstral test vectors,
    producing a coarsely corrected test vector by subtracting the running mean cepstral test vector from each cepstral test vector,
    (iii) vector quantizing the coarsely corrected test vector using the VQ codebook tree of step (a)(iii) and producing a VQ output vector corresponding to a vector quantized coarsely corrected test vector,
    (iv) computing a running average of coarsely corrected test vectors associated with each closest VQ codebook tree node, and
    (v) producing an output vector with reduced extraneous signals by adjusting the VQ output vector of step (b)(iii) by adding a fine correction vector formed by subtracting the running average coarsely corrected cepstral test vector from the vector quantized coarsely corrected test vector.

9. The method of claim 8 wherein the VQ codebook of step (a)(iii) is based on a binary tree.

10. The method of claim 8 wherein the running mean cepstral test vector of step (b)(i) is computed using an exponentially discounted moving average algorithm.

* * * * *